(12) United States Patent
Yeh et al.

(10) Patent No.: US 11,450,195 B2
(45) Date of Patent: Sep. 20, 2022

(54) WEARABLE DEVICE AND ASSOCIATED DETECTING METHOD

(71) Applicant: PixArt Imaging Inc., Hsin-Chu (TW)

(72) Inventors: Hsiu-Ling Yeh, Hsin-Chu (TW); Yung-Chang Lin, Hsin-Chu (TW)

(73) Assignee: PixArt Imaging Inc., Hsin-Chu (TW)

( * ) Notice: Subject to any disclaimer, the term of this patent is extended or adjusted under 35 U.S.C. 154(b) by 0 days.

(21) Appl. No.: 17/226,091

(22) Filed: Apr. 9, 2021

(65) Prior Publication Data

US 2021/0225153 A1 Jul. 22, 2021

Related U.S. Application Data

(62) Division of application No. 15/618,089, filed on Jun. 8, 2017, now Pat. No. 11,011,042.

(30) Foreign Application Priority Data

Dec. 27, 2016 (TW) ................. 105143326

(51) Int. Cl.
| | |
|---|---|
| G01J 3/45 | (2006.01) |
| G08B 21/18 | (2006.01) |
| H04N 5/235 | (2006.01) |
| G06F 1/16 | (2006.01) |
| G08B 5/36 | (2006.01) |
| G08B 21/04 | (2006.01) |
| G08B 25/08 | (2006.01) |

(52) U.S. Cl.
CPC ........... *G08B 21/182* (2013.01); *G06F 1/163* (2013.01); *G06F 1/1684* (2013.01); *G08B 5/36* (2013.01); *G08B 21/0453* (2013.01); *G08B 25/08* (2013.01); *H04N 5/2351* (2013.01); *H04N 5/2352* (2013.01); *H04N 5/2353* (2013.01)

(58) Field of Classification Search
CPC ...... G01N 21/21; G01N 21/211; G01N 21/23; G01J 4/04; G01J 4/00
USPC .......................................... 356/445
See application file for complete search history.

(56) References Cited

U.S. PATENT DOCUMENTS

| | | | | |
|---|---|---|---|---|
| 2006/0171848 | A1* | 8/2006 | Roche | H01J 37/32935 422/98 |
| 2006/0285314 | A1* | 12/2006 | Barker | F21V 21/145 362/103 |
| 2010/0229377 | A1 | 9/2010 | Jindo | |
| 2012/0215115 | A1 | 8/2012 | Takahashi | |
| 2014/0135644 | A1 | 5/2014 | Kim | |
| 2015/0062322 | A1 | 3/2015 | Gustafsson | |
| 2015/0137972 | A1 | 5/2015 | Nepo | |

(Continued)

FOREIGN PATENT DOCUMENTS

| | | |
|---|---|---|
| CN | 1692874 A | 11/2005 |
| CN | 102346571 A | 2/2012 |

(Continued)

*Primary Examiner* — Md M Rahman
(74) *Attorney, Agent, or Firm* — Winston Hsu

(57) ABSTRACT

Disclosed is a detecting method of a wearable device, which comprises: providing a current to drive a light source to emit auxiliary light corresponding to ambient light received by the wearable device; and informing a wearing status indicative whether the wearable device is correctly worn by a user or not according to the current. By this way, the wearing status of the user can be easily detected.

13 Claims, 2 Drawing Sheets

(56) References Cited

U.S. PATENT DOCUMENTS

| | | |
|---|---|---|
| 2015/0145673 A1 | 5/2015 | Choi |
| 2015/0204556 A1 | 7/2015 | Kusukame |
| 2016/0026211 A1 | 1/2016 | Luna |
| 2016/0242657 A1 | 8/2016 | Wang |
| 2016/0253487 A1 | 9/2016 | Sarkar |
| 2016/0278647 A1 | 9/2016 | Vogel |
| 2016/0285514 A1 | 9/2016 | Chen |
| 2016/0287127 A1 | 10/2016 | Kesinger |
| 2017/0049361 A1 | 2/2017 | Tanimura |
| 2017/0061201 A1 | 3/2017 | Wexler |
| 2017/0061213 A1 | 3/2017 | Wexler |

FOREIGN PATENT DOCUMENTS

| | | |
|---|---|---|
| CN | 103677437 A | 3/2014 |
| CN | 104135604 A | 11/2014 |
| CN | 104146690 A | 11/2014 |
| CN | 104658202 A | 5/2015 |
| CN | 104799838 A | 7/2015 |
| CN | 105027140 A | 11/2015 |
| CN | 105302541 A | 2/2016 |
| CN | 105309040 A | 2/2016 |
| CN | 205041401 U | 2/2016 |
| CN | 105389957 A | 3/2016 |
| CN | 105533940 A | 5/2016 |
| CN | 105938392 A | 9/2016 |
| CN | 105996980 A | 10/2016 |
| KR | 10-1453482 B1 | 10/2014 |
| KR | 10-2015-0060304 A | 6/2015 |
| TW | 201635087 A | 10/2016 |
| WO | 2016/096391 A1 | 6/2016 |

\* cited by examiner

WEARABLE DEVICE AND ASSOCIATED DETECTING METHOD

CROSS REFERENCE TO RELATED APPLICATIONS

This application is a division of applicant's earlier application, Ser. No. 15/618,089, filed 2017 Jun. 8, and is included herein by reference.

BACKGROUND OF THE INVENTION

1. Field of the Invention

The present invention relates to a wearable device, and more particularly, to a wearable device capable of informing a user whether the device is correctly worn, and an associated detecting method.

2. Description of the Prior Art

A wearable device for detecting biological information of a user must be tightly attached to the user (for example, by the wrists); otherwise, the detected bio data will not be 100% correct. When the device is worn during exercise, however, the user might not be able to notice if the device is perfectly attached all the time, which can result in incorrect bio data detection.

SUMMARY OF THE INVENTION

One of the objectives of the present inventions is to provide a wearable device capable of informing a user whether the device is correctly worn, and an associated detecting method, to solve the abovementioned problem.

One embodiment of the present invention discloses a detecting method of a wearable device, which comprises: providing a current to drive a light source to emit auxiliary light corresponding to ambient light received by the wearable device; and informing a wearing status indicative whether the wearable device is correctly worn by a user or not according to the current.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should not be interpreted as a close-ended term such as "consist of". Also, the term "couple" is intended to mean either an indirect or direct electrical connection. Accordingly, if one device is coupled to another device, that connection may be through a direct electrical connection, or through an indirect electrical connection via other devices and connections.

Figure 1:
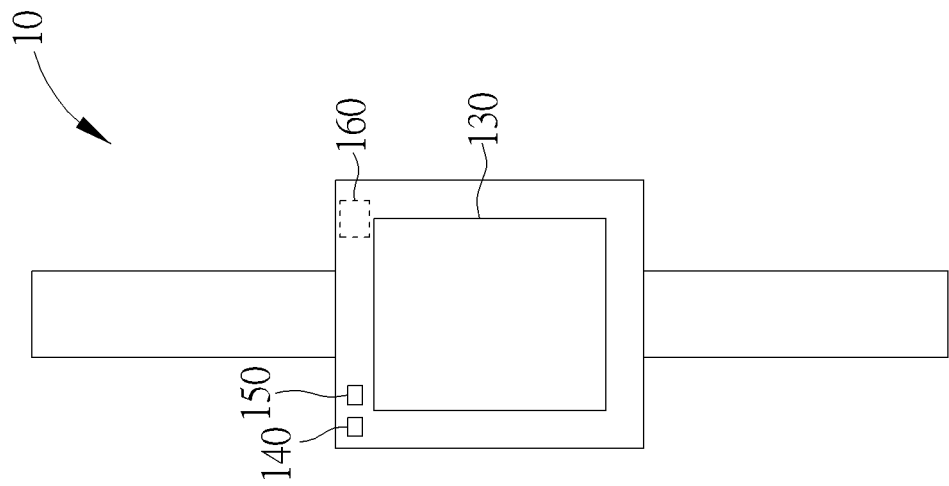
FIG. 1 is a diagram illustrating a wearable device attached to a user according to an embodiment of the present invention.
Figure 1:
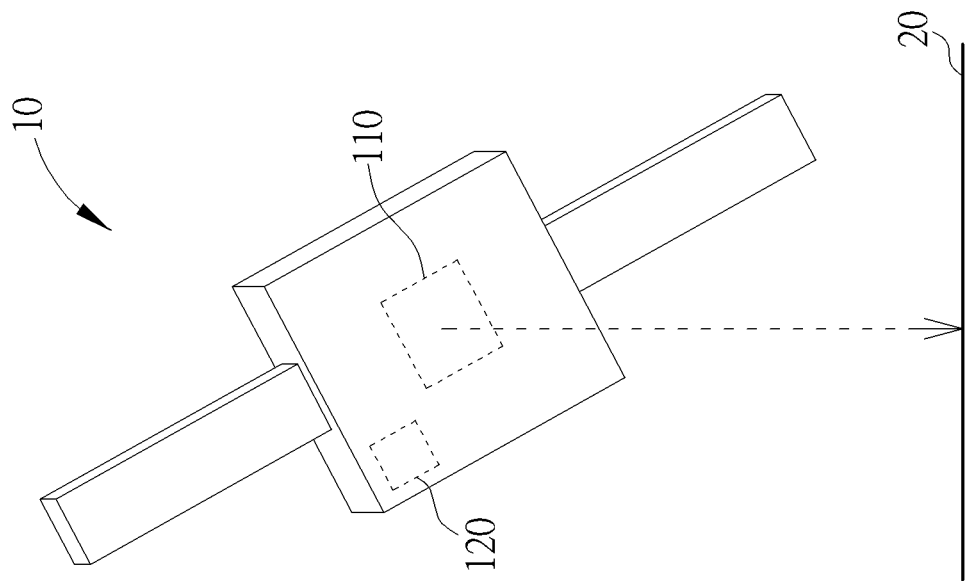

FIG. 1 is a diagram illustrating a wearable device 10 attached to a user 20 according to an embodiment of the present invention. It should be noted that the wearable device 10 depicted in FIG. 1 is a watch-shaped device wrapped around a wrist of the user 20; however, the wearable device 10 disclosed by the present invention is not limited to be a watch type device, and can also be a ring, a pair of glasses, an armband etc. for detecting biologic information of the user 20. In the following paragraphs, the wearable device 10 is the watch-shaped device illustrated in FIG. 1.

As shown in FIG. 1, the wearable device 10 comprises a sensing circuit 110 and a processing circuit 120, wherein the sensing circuit 110 may comprise one or more sensors for detecting bio data, e.g. the heart rate and/or blood pressure of the user 20. After being processed by the processing circuit 120, the detected bio data can be shown on a display device 130 of the wearable device 10 for informing the user. The sensing circuit 110, for sensing purposes, is preferably installed on a bottom surface of the wearable device 10 which attaches to the user's skin for higher accuracy, as shown in FIG. 1. This is only for illustrative purposes, and not a limitation of the present invention. The location of the sensing circuit 110 is based on the designer's consideration. The present invention is focused on informing a wearing status indicative of a status of wearing the wearable device 10 rather than particular methods of bio data detection. More specifically, the wearable device 10 disclosed by the present invention is capable of informing the user when the device is not correctly worn in order to prevent incorrect bio data detection.

Figure 2:
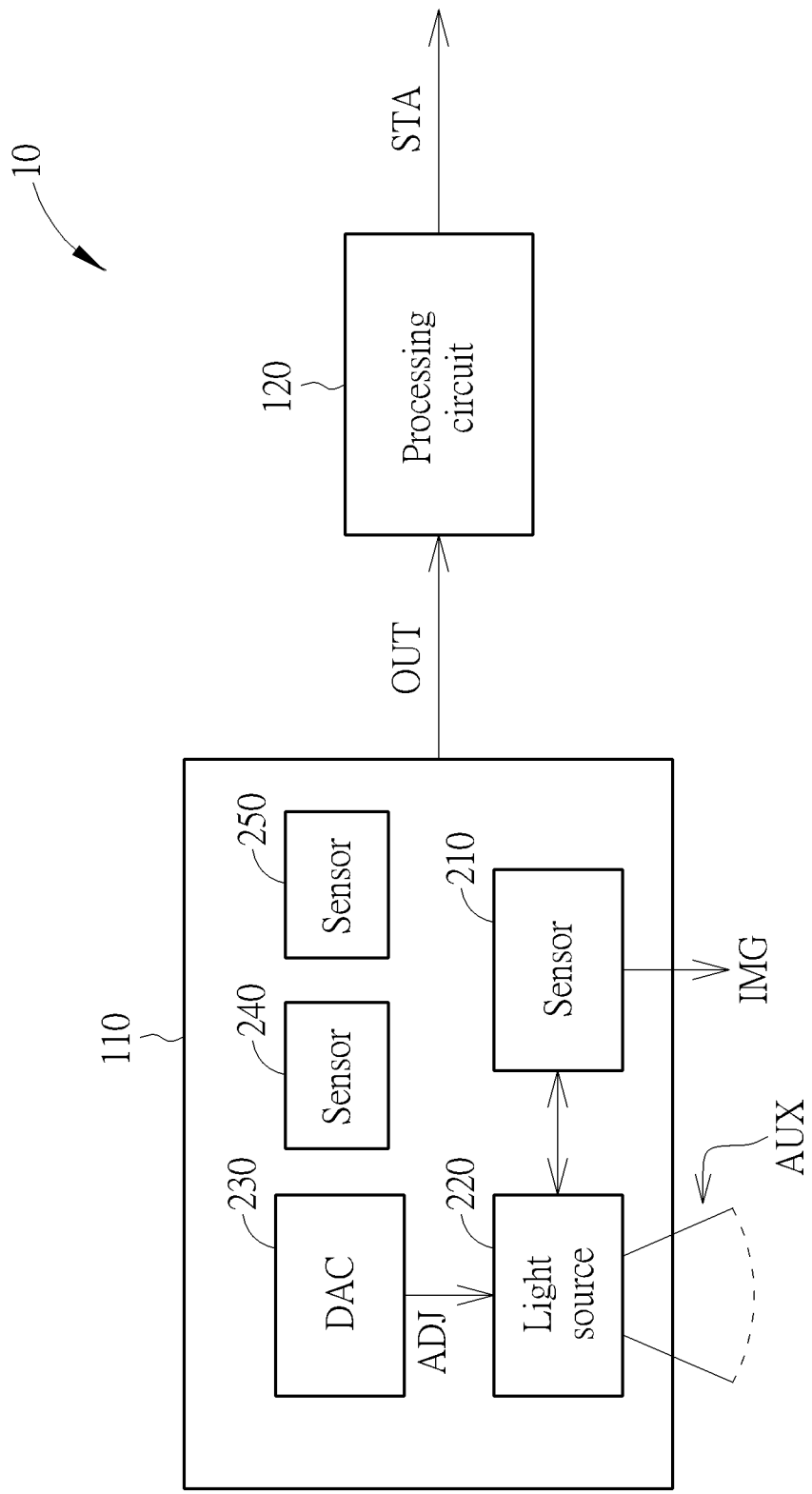
FIG. 2 is a diagram illustrating the wearable device of the embodiment of FIG. 1.

FIG. 2 is a diagram illustrating the wearable device 10 of the embodiment of FIG. 1. The sensing circuit 110 is arranged to generate a wearing information output OUT in each of a plurality of detecting periods, which is sent to the processing circuit 120. The processing circuit 120 is arranged to calculate a variation between two wearing information outputs generated by the sensing circuit 110, and informs a wearing status STA indicative of a status of wearing the wearable device 10 according to the calculated variation. As mentioned above, the sensing circuit 110 may comprise one or more sensors to detect the bio data. In this embodiment, one of those sensors is an image sensor (e.g. the sensor 210) for capturing a detecting image IMG in each detecting period.

Those skilled in the art should readily understand that the image sensor 210 captures the detecting image IMG with parameters such as shutter speed and aperture, which are summarized as the exposure time in this description. By referring to a brightness of detected data such as the brightness of at least a part of a previous detecting image IMG (e.g. a part or all of it), the image sensor 210 adjusts the exposure time to achieve a better performance when taking the detecting image. In this case, the exposure time corresponding to the brightness of at least a part of the detecting image is the wearing information output OUT which is sent to the processing circuit 120. More specifically, when the wearable device 10 is tightly attached to the user, every detecting image IMG taken by the image sensor 210 should be taken with a steady exposure time considering that the ambient light from the outside is also steady. When the wearable device 10 is no longer tightly attached to the user, i.e. the wearable device 10 is incorrectly worn by the user potentially causing incorrect bio data detection, the ambient light from the output side may vary dramatically, which results in a huge variation in exposure time for taking the detecting image IMG. By calculating the variation between the exposure time corresponding to two detecting images, the processing circuit 120 can determine if the wearable device 10 is correctly worn by the user by determining if the variation is greater than a predetermined threshold value, and inform the user of the wearing status STA.

Table 1 illustrates an example of taking the exposure time as the wearing information output. As described in Table 1, three wearing information outputs detected in three consecutive detecting periods or, in this case, three exposure time values corresponding to the brightness of three consecutive detecting images (i.e. $IMG_1$, $IMG_2$, and $IMG_3$) are received by the processing circuit 120 for calculating the variation mentioned above.

TABLE 1

| Detecting image | $IMG_1$ | $IMG_2$ | $IMG_3$ |
|---|---|---|---|
| Expo_time | 60 | 46 | 70 |

From the detecting image $IMG_1$ to the detecting image $IMG_2$, the process circuit 120 calculates the variation $V_1$ as:

$$V_1 = \frac{|46-60|}{60} = 23\% \quad (1)$$

Then, from the detecting image $IMG_2$ to the detecting image $IMG_3$, the process circuit 120 calculates the variation $V_2$ as:

$$V_2 = \frac{|70-46|}{46} = 52\% \quad (2)$$

From equations (1) and (2), the variation $V_1$ calculated by the processing circuit 120 is 23% while the variation $V_2$ calculated by the processing circuit 120 is 52%. Assuming that the predetermined threshold is 50%, the processing circuit 120 can thus determine that wearable device 10 is well-attached to the user during the period from the detecting image $IMG_1$ to the detecting image $IMG_2$ due to the variation $V_1$ not being greater than 50%, and outputs the wearing status STA to inform the user of the well-attached status. On the other hand, the processing circuit 120 can determine that the wearable device 10 is no longer attached to the user tightly during the period from the detecting image $IMG_2$ to the detecting image $IMG_3$ due to the variation $V_2$ being greater than 50%, and outputs the wearing status STA to inform the user of the incorrect wearing of the wearable device 10.

It should be noted that the processing circuit 120 can inform the wearing status STA to the user via different ways, and these are not limited in the present invention. For example, the wearing status STA can be displayed on the display device 130 of the wearable device 10 via text, icons, or pictures, or represented by different colors of light emitting diodes (LEDs), e.g. a green-light LED 140 represents the wearable device 10 is well-attached and a red-light LED 150 represents the wearable device 10 is worn incorrectly. In another example, the user can be alerted by a beeping sound output via a speaker 160 when the wearing status STA indicates the wearable device 10 is incorrectly worn.

In another embodiment, the variations can be calculated by the processing circuit 120 using different equations. An average of the variations of N detecting images $V_{avg}$ is calculated by the processing circuit 120 based on equation (3) shown below, wherein the wearing status STA is output to inform the incorrect wearing of the wearable device 10 when the average is greater than a predetermined threshold.

$$V_{avg} = \left( \sum_{i=1}^{N} \frac{|Expo\_Time_{i-1} - Expo\_Time_i|}{Expo\_Time_{i-1}} \right) / (N-1) \quad (3)$$

Taking the exposure time values shown in the Table 1 as an example, the average variation $V_{avg}$ is (0.23+0.52)/2=0.425 according to the equation (3). Assuming the predetermine threshold is 0.2, the processing circuit 120 can thus determine that the wearable device 10 is incorrectly worn during these three detecting periods due to the average variation $V_{avg}$ being greater than 0.2.

In yet another embodiment, the processing circuit 120 can count the number of variations which are greater than a predetermine threshold, and inform the wearing status STA indicative of incorrect wearing of the wearable device 10 when the number of the variations is greater than a predetermined value. For example, during ten detecting periods, the processing calculates the variations of these ten detecting periods, counts the number of variation which are greater than 20%, and informs the wearing status STA indicative of incorrect wearing of the wearable device 10 when the number of variations greater than 20% is more than 3 during these ten detecting periods.

It should be noted that the calculation of the variation or the criteria for determining whether the wearable device is incorrectly worn is not limited in the present invention. Those skilled in the art should understand that the present invention encompasses other alternative designs, as long as the variation is calculated according to the wearing information output OUT and the wearing status STA is generated according to said variation.

Referring to FIG. 2 again, in another embodiment, the sensing circuit 110 can further comprise a light source 220 arranged to provide an auxiliary light AUX for the image sensor 210 capturing the detecting image IMG. By referring to a brightness of at least a part of the detecting image IMG, the auxiliary light AUX is adjusted to achieve a better performance when taking the detecting image. In this case, the intensity of the auxiliary light AUX corresponding to the brightness of at least a part of the detecting image is the wearing information output OUT to the processing circuit 120. More specifically, when the wearable device 10 is tightly attached to the user, every detecting image IMG taken by the image sensor 210 should be taken with a steady auxiliary light AUX considering the ambient light from outside is also steady. When the wearable device 10 is no longer tightly attached to the user, i.e. the wearable device 10 is incorrectly worn by the user potentially causing incorrect bio data detection, the ambient light from the output side may vary dramatically resulting in a huge variation of the intensity of the auxiliary light AUX for taking the detecting image IMG. By calculating the variation between the intensities of the auxiliary light AUX corresponding to two detecting images, the processing circuit 120 can determine if the wearable device 10 is correctly worn by the user by determining if the variation is greater than a predetermined threshold value, and inform the wearing status STA to the user. In other embodiments, the current of the light source 220 for providing the auxiliary light AUX may be configured to be the wearing information output OUT. More specifically, by referring to a brightness of at least a part of the detecting image IMG, the auxiliary light AUX is adjusted to achieve a better performance when taking the detecting image. In this case, the magnitude or the duty cycle of the current of the light source 220 for adjusting the intensity of the auxiliary light AUX corresponding to the brightness of at least a part of the detecting image is the wearing information output OUT to the processing circuit 120. When the wearable device 10 is no longer tightly attached to the user, i.e. the wearable device 10 is incorrectly worn by the user potentially causing incorrect bio data detection, the ambient light from the output side may vary dramatically resulting in a huge variation of the magnitude or the duty cycle of the current of the light source 220 for adjusting the intensity of the auxiliary light AUX for taking the detecting image IMG. By calculating the variation between the magnitude or the duty cycle of the current corresponding to two detecting images, the processing circuit 120 can determine if the wearable device 10 is correctly worn by the user by determining if the variation is greater than a predetermined threshold value, and inform the wearing status STA to the user.

In yet another embodiment, the sensing circuit 110 can further comprise a digital-to-analog converter 230 arranged to provide an adjusting signal ADJ to the light source 220 to control the current passing through the light source 220 and adjust the intensity of auxiliary light AUX for the image sensor 210 capturing the detecting image IMG. By referring to a brightness of at least a part of the detecting image IMG, the adjusting signal ADJ is adjusted for a better performance when taking the next detecting image. In this case, the adjusting signal ADJ corresponding to the brightness of at least a part of the detecting image is the wearing information output OUT to the processing circuit 120. More specifically, when the wearable device 10 is tightly attached to the user, every detecting image IMG taken by the image sensor 210 should be taken with a steady adjusting signal ADJ for controlling the auxiliary light AUX considering the ambient light from outside is also steady. When the wearable device 10 is no longer tightly attached to the user, i.e. the wearable device 10 is incorrectly worn by the user potentially causing incorrect bio data detection, the ambient light from the output side may vary dramatically resulting in a huge variation of the adjusting signal ADJ for taking the detecting image IMG. By calculating the variation between the magnitudes of the adjusting signals corresponding to two detecting images, the processing circuit 120 can determine if the wearable device 10 is correctly worn by the user by determining if the variation is greater than a predetermined threshold value, and inform the wearing status STA to the user. It should be noted that the topology of the DAC 230 is not limited in the present invention. For example, the DAC 230 can be a pulse-width modulator DAC, a delta-sigma DAC, a binary-weighted DAC, or a cyclic DAC, etc.

When the wearing information output OUT is the magnitude of the adjusting signal ADJ or the intensity of the auxiliary light AUX, the variation can be calculated by the processing circuit 120 using the abovementioned methods. Those skilled in the art should readily understand the implementation; the detailed description is therefore omitted here for brevity.

As mentioned above, the sensing circuit 110 comprises one or more sensors for detecting the bio data of the user. In one embodiment, one of those sensors is a pressure sensor (e.g. the sensor 240) for detecting the pressure of the wearable device 10 against the user in each detecting period. The pressure detected in each detecting period can be the wearing information output OUT to the processing circuit 120. More specifically, when the wearable device 10 is tightly attached to the user, every detected pressure detected by the pressure sensor 240 should be a steady value. When the wearable device 10 is no longer tightly attached to the user, i.e. the wearable device 10 is incorrectly worn by the user potentially causing incorrect bio data detection, the detected pressure may vary dramatically. By calculating the variation between the pressures detected in two detecting periods, the processing circuit 120 can determine if the wearable device 10 is correctly worn by the user by determining if the variation is greater than a predetermined threshold value, and inform the wearing status STA to the user.

In another embodiment, one of those sensors is a thermal sensor (e.g. the sensor 250) for detecting the temperature of the wearable device against the user in each detecting period. The temperature detected in each detecting period can be the wearing information output OUT to the processing circuit 120. More specifically, when the wearable device 10 is tightly attached to the user, every detected temperature detected by the thermal sensor 220 should be a steady value. When the wearable device 10 is no longer tightly attached to the user, i.e. the wearable device 10 is incorrectly worn by the user potentially causing incorrect bio data detection, the detected temperature may vary dramatically. By calculating the variation between the temperature detected in two detecting periods, the processing circuit 120 can determine if the wearable device 10 is correctly worn by the user by determining if the variation is greater than a predetermined threshold value, and inform the wearing status STA to the user.

Briefly summarized, the present invention utilizes those sensors originally installed in the wearable device to generate a wearing information output, and the processing circuit informs the wearing status to the user according to the wearing information output. As those sensors are originally installed in the wearable device, using them to generate the wearing information output will not result in excess power consumption. Via the wearing information output, the user can be informed when the wearable device is not correctly worn, therefore preventing incorrect bio data detection.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:
1. A detecting method of a wearable device, comprising:
   providing a current to drive a light source to emit auxiliary light corresponding to ambient light received by the wearable device; and
   informing a wearing status of a user according to the current;
   wherein the step of providing a current to drive a light source to emit auxiliary light corresponding to ambient light received by the wearable device comprises:
   capturing a detecting image in each of a plurality of detecting periods;
   wherein the current is corresponding to a brightness of at least a part of the detecting image.

2. The detecting method of claim 1, wherein the step of informing the wearing status comprises:
calculating a variation between the current generated in a first detecting period and the current generated in a second detecting period; and
determining the wearing status according to the variation.

3. The detecting method of claim 1, further comprising:
using the auxiliary light to capture another detecting image according to the brightness of the at least a part of the detecting image.

4. The detecting method of claim 1, wherein the step of informing the wearing status further comprises:
informing the wearing status according to a magnitude of the current.

5. The detecting method of claim 1, wherein the step of informing the wearing status further comprises:
informing the wearing status according to a duty cycle of the current.

6. The detecting method of claim 1, further comprising:
performing a digital-to-analog conversion to provide an adjusting signal, wherein the auxiliary light is controlled according to the adjusting signal; and
informing the wearing status according to the adjusting signal.

7. The detecting method of claim 1, further comprising:
detecting a pressure for the wearable device against the user; and
informing the wearing status according to the pressure.

8. The detecting method of claim 1, further comprising:
detecting a temperature for the wearable device against the user in each of the plurality detecting periods; and
informing the wearing status according to the temperature.

9. The detecting method of claim 1, further comprising:
displaying the wearing status on a display device; or
displaying the wearing status as a specific color of light.

10. The detecting method of claim 1, further comprising:
displaying the wearing status on a display device; or
displaying the wearing status as a specific color of light.

11. A detecting method of a wearable device, comprising:
providing a current to drive a light source to emit auxiliary light corresponding to ambient light received by the wearable device; and
using the auxiliary light to capture a detecting image according to brightness of at least apart of the detecting image;
performing a digital-to-analog conversion to provide an adjusting signal, wherein the auxiliary light is controlled according to the adjusting signal; and
informing a wearing status of a user according to the adjusting signal.

12. The detecting method of claim 11, further comprising:
detecting a pressure for the wearable device against the user; and
informing the wearing status according to the pressure.

13. The detecting method of claim 11, further comprising:
detecting a temperature for the wearable device against the user; and
informing the wearing status according to the temperature.

* * * * *